Aug. 8, 1933.  A. J. BEHLING  1,921,651
PICKING AND HARVESTING MACHINE
Filed Jan. 22, 1932  3 Sheets-Sheet 1
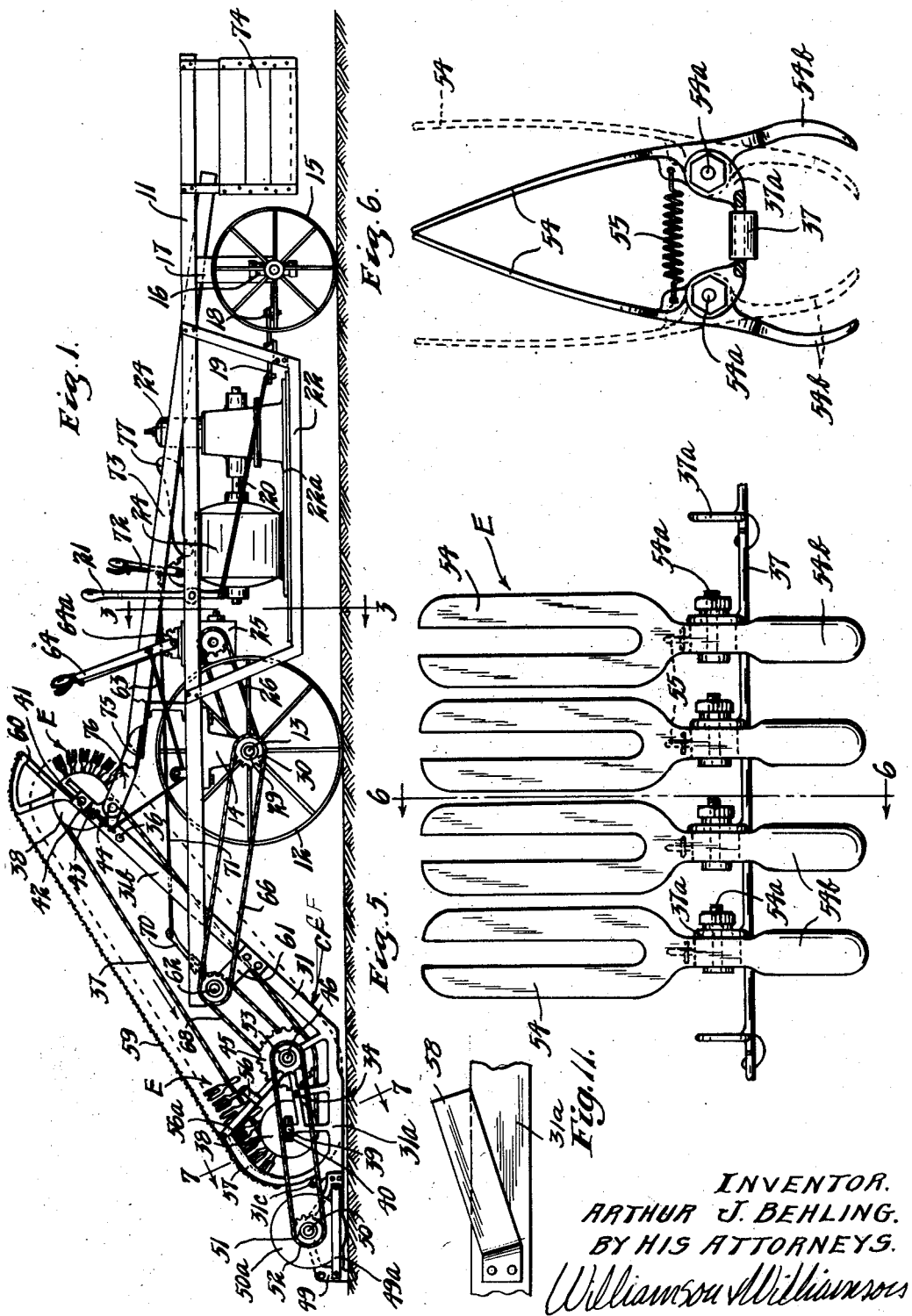
INVENTOR.
ARTHUR J. BEHLING.
BY HIS ATTORNEYS.
Williamson & Williamson Aug. 8, 1933.   A. J. BEHLING   1,921,651
PICKING AND HARVESTING MACHINE
Filed Jan. 22, 1932   3 Sheets-Sheet 2
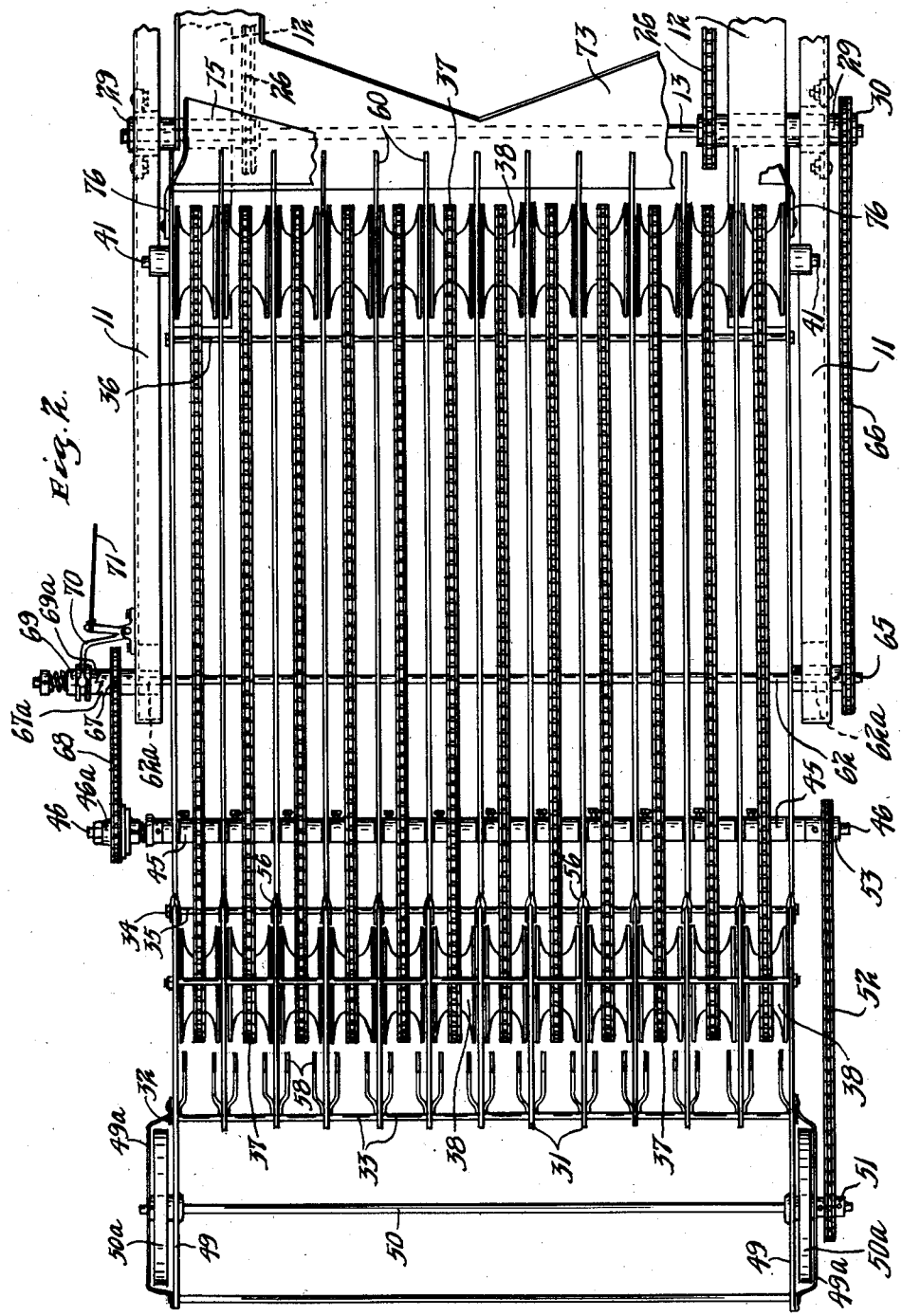
INVENTOR.
ARTHUR J. BEHLING.
BY HIS ATTORNEYS.

Aug. 8, 1933.   A. J. BEHLING   1,921,651
PICKING AND HARVESTING MACHINE
Filed Jan. 22, 1932   3 Sheets-Sheet 3
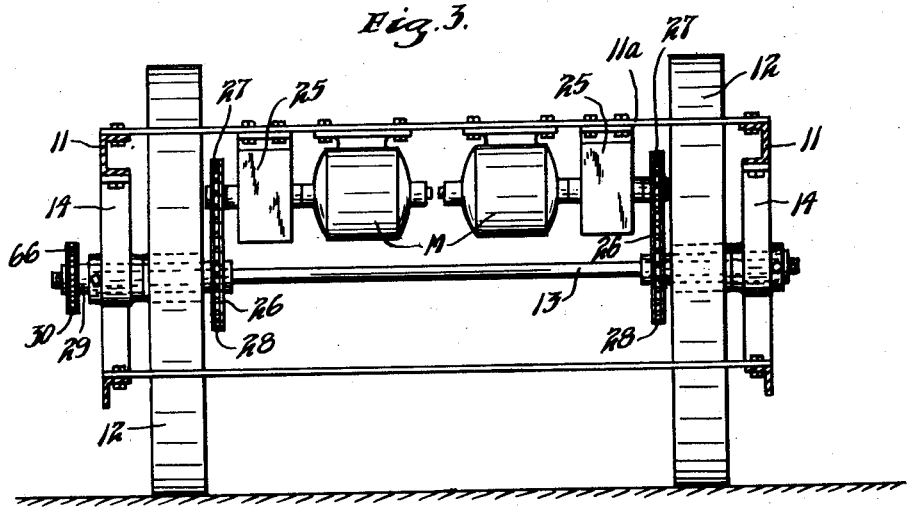
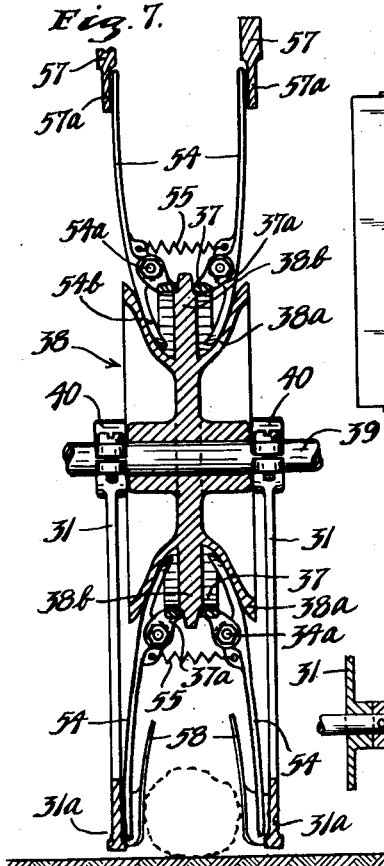
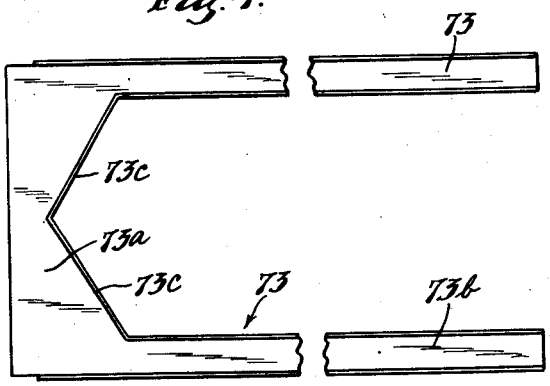
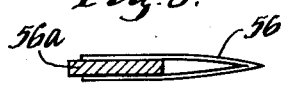
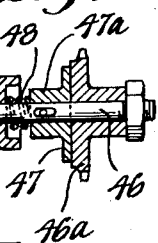
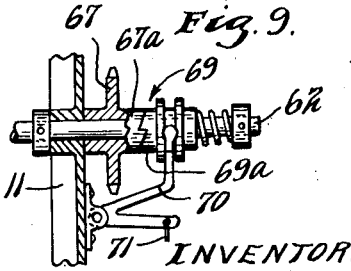
INVENTOR.
ARTHUR J. BEHLING.
BY HIS ATTORNEYS.
Williamson & Williamson Patented Aug. 8, 1933

1,921,651

UNITED STATES PATENT OFFICE 1,921,651

PICKING AND HARVESTING MACHINE

Arthur J. Behling, Chicago, Ill., assignor, by direct and mesne assignments, to Pioneer Fruit Harvesting Company, a Corporation of Minnesota Application January 22, 1932. Serial No. 588,102

16 Claims. (Cl. 56—328)

This invention relates to picking and harvesting machines and particularly to a machine for picking articles such as fruit and nuts from the ground.

My improved machine, although capable of wide general use for picking and harvesting, is particularly applicable for harvesting prune plums. These plums, when ripe, drop to the ground and the entire crop must usually be picked within a few weeks. At the present time hand labor is employed and the ground below the trees is harrowed and dragged to prevent injury to the fallen fruit and the cost of harvesting the crop is comparatively high.

It is an object of my present invention to provide a comparatively simple and highly efficient machine which is constructed to travel over the ground and which will very rapidly pick and collect prune plums and other fruit and nuts, such as walnuts, reproducing, as nearly as possible, the picking action of the human hand in order that tender fruit and the like may be cleanly picked without bruising.

It is a further object to provide a machine of the class described which may be conveniently controlled, which may travel between the rows of trees and beneath the branches of low trees, such as prune trees and which will pick the fruit or other articles without removing soil, dirt or rubbish.

More specifically it is an object to provide a picking machine of the class described which utilizes a series of parallel parting bars or blades disposed at substantially the level of the ground for defining a series of narrow lanes wherein the articles arrange themselves in rows for picking and to associate with said parting bars or blades picking mechanism whereby the articles are individually grasped without danger of bruising or piercing and are removed and carried to collection apparatus mounted rearwardly of the picker on the machine.

Another object is to provide a machine of the class described which preferably will carry its own source of propelling and driving power, which will make provisions for variations and irregularities in the contour of the ground and which has facilities for displaying the fruit or other articles for observation as they are collected.

Another object is to provide in a picking machine of the class described endless chains or other carrier elements upon which the picker elements are mounted and to synchronize the movement or speed of the carrier elements with the travel of the machine over the ground to pick the fruit to best advantage.

These and other objects and advantages of the invention will be fully set forth in the following description made in connection with the accompanying drawings, in which like reference characters refer to similar parts throughout the several views, and in which:—

Fig. 1 is a side elevation of an embodiment of my invention, a few of the parts being broken away to better show some of the construction;

Fig. 2 is a top plan view of the picker mechanism and the front portion of the collecting trough;

Fig. 3 is a cross section taken substantially on the line 3—3 of Fig. 1, looking in the direction of the arrows;

Fig. 4 is a fragmentary plan view of the collecting trough detached;

Fig. 5 is a fragmentary side elevation showing a portion of one of the endless carrier elements or chains with several of the picker elements operatively attached thereto;

Fig. 6 is a cross section taken on the line 6—6 of Fig. 5 showing one of the picker elements, the dotted lines indicating the open or receiving position of said elements;

Fig. 7 is a detail cross section taken substantially on the line 7—7 of Fig. 1 illustrating the efficient camming action for opening or retracting the fingers of the picker elements;

Fig. 8 is a detail view illustrating the construction of one of the spring guards for assuring the alignment of the picker elements as they move toward the camming wheel at the front of the machine;

Fig. 9 is a detail view partly in elevation and partly in horizontal section showing clutch mechanism for disconnecting the source of driving power with the picker mechanism, and Fig. 10 is a detail section showing a form of friction, slip clutch associated with the driven shaft of the picker mechanism.

Fig. 11 is an inside detail view showing the attachment of one of the spring guard and centering fingers to one of the parting blades.

In the form of the invention illustrated an elongated substantially rectangular main frame 11 is provided, supported somewhat rearwardly of its forward end by a pair of relatively large wheels 12 which are journaled on a stationary axle 13 mounted in a pair of depending bolsters 14. A pair of steering wheels 15 support the rear of the frame 11 and as shown are mounted on suitable spindle structures 16 connected with the outer ends of stationary axle 13 which axle is secured to the lower ends of depending bolsters 17. The spindle arms for the steering wheels 15 are connected together in conventional manner by a suitable tie rod 18 and the tie rod is connected with one end of a bell crank steering lever 19 which is actuated by means of a link 20 connected with a steering lever 21 fulcrumed on one of the longitudinal channels of frame 11. The connection between the rear end or arm of bell crank 19 with the tie rod is made by pin and slot.

A sub-frame 22 is suspended from the medial portion of the main frame 11 and carries a platform 22a disposed considerably below the top of frame 11, upon which platform a suitable source of power, such as an internal combustion engine 24 is mounted, connected for driving an electrical generator 24 which is also supported from platform 22a and which as shown is disposed directly in advance of the engine 24. Generator 24 supplies electrical energy for operating a pair of electrical motors M which may be conveniently attached to a cross bar 11a of the main frame forwardly of the generator. The armature shafts of motors M are axially aligned and extend transversely of frame 11 and each motor is provided with reduction gearing mechanism 25 which may also be supported from the cross bar 11a. The power take off shafts of the two reduction gearing mechanisms 25 are each connected for driving one of the wheels 12 by suitable means such as a chain 26 and sprockets 27 and 28. Sprockets 27 are each fixed to a sleeve rigidly secured to one of the wheels. One of the wheels 12 (see Figs. 2 and 3) rigidly carries an outwardly projecting sleeve 29 which has affixed thereto a power take off sprocket 30 for driving the picker mechanism.

It will be noted that each of the traction wheels 12 is independently driven by its appropriate electrical motor M. The electrical connections between the generator and the two electric motors M are made in such manner that a differential action of the traction wheels is obtained when the vehicle turns or follows a curved path. Suitable control means, such as an electrical controller or a conventional starting rheostat is provided in the electrical circuit for the motors whereby the vehicle may be started or stopped or the speed varied within, of course, certain limits.

The picker mechanism is mounted and preferably counterbalanced on the forward end of frame 11. As shown, I provide an angularly shaped carrier frame CF which may conveniently comprise a series of vertically spaced frame members 31 having substantially horizontal base portions 31a which constitute parting bars or blades disposed edgewise to the ground and upwardly extending arms 31b which are inclined at an obtuse angle to the base portions 31a. The several frame members 31 are secured rigidly together in spaced relation by means of a transverse rod 32 passing through projections or lugs 31c provided at the forward ends thereof, spacing sleeves 33 being interposed between the several frame pieces. A second rod 34 extends through intermediate portions of the frame members 31 (see Figs. 1 and 2), said intermediate portions extending considerably above the level of the parting blades 31a and being formed as a grill work to minimize the weight of the frame members. Spacing sleeves 35 are mounted on rod 34 interposed between the several frame members 31. A third tie rod 36 equipped with suitable spacing sleeves connects the upper portions of the inclined arms 31b rigidly spacing the frame members apart as desired.

As shown, the several parting blades or bars 31a define a series of narrow lanes at substantially the ground level and a picker mechanism including an endless carrier such as a chain 37 carrying a series of individual picker elements E is associated with each of the lanes so formed. The several endless carriers or chains 37 are trained about upper and lower camming sheaves 38, said two series of camming sheaves as illustrated being identical in construction and each comprising a pair of deeply concave disks 38a integrally formed if desired with a medially disposed sprocket 38b which engages the chain. The lower series of camming sheaves 38 are loosely mounted upon a stationary shaft 39 which may be conveniently clamped by suitable split brackets 40 provided by the grating portion disposed above the parting blades 31a and connected therewith. The upper series of camming sheaves 38 are loosely mounted upon a stationary or floating shaft 41 which is mounted in a series of shaft supporting blocks 42, one being provided, as shown, for each of the frame members 31 and each being slidably mounted in a bifurcated portion of its respective frame member at the upper end of inclined arm 31b thereof. Compression springs 43 urge blocks 42 upwardly or outwardly to properly tension the chains 37 and said springs are provided with suitable adjustment devices 44 of conventional type.

The several endless chains or carriers 37 are driven in counter-clockwise direction by a series of driving sprockets 45 which are fixed to a rotary shaft 46 journaled in suitable bearings provided by the reticulated or grating portions of the several frame members 31. Shaft 46 is disposed rearwardly of the stationary shaft 39 upon which the lower series of camming sheaves are journaled and is disposed slightly above the level of shaft 39 for a purpose later to be explained. It will be noted that sprockets 45 in cooperation with the lower camming sheaves 38 distend the chains or carriers 37 in such manner that short runs of the several chains are disposed substantially parallel with the ground at some distance thereabove adjacent the forward end of the machine. Shaft 46 is provided at one of the projecting ends thereof with a sprocket 46a loosely mounted thereon and said sprocket is frictionally connected for driving said shaft by means of a friction clutch comprising a disk 47 urged outwardly against the inner friction face of sprocket 46a by suitable means such as a coil spring 48, said disk 47 having a hub 47a which is keyed or connected by slot and pin with the shaft 46 (see Figs. 2 and 10).

The end frame members 31 are provided at their lower and outer extremities with rigidly secured extension parting blades 49. A creeper wheel shaft 50 is journaled in the two extension parting blades and extends transversely of the machine at the front thereof, having affixed to the ends thereof creeper wheels 50a disposed outwardly of the blades. Horizontal guard strips 49a are secured to extension blades 49 and disposed outwardly of the creeper wheels 50a to deflect articles, such as fruit, outwardly of the picker mechanism to prevent crushing thereof beneath the creeper wheels 50a. One of the projecting ends of creeper wheel shaft 50 has affixed thereto a sprocket 51 which is connected for driving by an endless chain 52 with a driving sprocket 53 affixed to the corresponding end of the shaft 46 on which the several driving sprockets for the endless carriers are mounted. As stated, a continuous series of picker elements E are carried by each of the endless chains or carriers 37. Each of said picker elements preferably comprises a pair of cooperating, as shown bifurcated, fingers 54 pivoted, by suitable means such as bolt 54a, to spaced lugs 37a provided on opposite sides of the endless chain 37. The two cooperating fingers 54 of each element are urged together as shown by a small contractile spring 55, the ends of which may be connected to apertured lugs disposed outwardly of the pivot bolts 54a. The article engaging portions of the bifurcated fingers are substantially flat and are curved slightly inwardly to more efficiently cooperate in grasping the fruit or other article. Fingers 54 rigidly carry thickened and inwardly extending camming arms 54b which are curved substantially in conformance with the camming surfaces or inner peripheries of the camming sheaves 38, as clearly shown in Fig. 7.

V-shaped spring guards 56 are mounted on narrow arms 56a which overhang the lower series of camming sheaves 38, one of said arms being integrally formed with each of the frame members 31. Guards 56 extend substantially in the same plane with the associated frame members and substantially perpendicular to the arms 56a for the purpose of assuring the proper alignment of the fingers 54 preparatory to their passage into the camming sheaves.

Further guiding means are provided for assuring the proper alignment of the picker elements with the lower camming sheaves as they approach the same. As best shown in Figs. 1 and 7, arcuate bars 57 are provided on the forward portions of each of the frame members 31, these arcuate bars extending from the overhanging bars 56a to the parting blades 31a and extending concentric with the camming sheaves 38. These arcuate bars lie in substantially the same plane as the other portions of the respective frame members 31 and are rabbeted at 57a to engage and guide the outer ends of the picker fingers 54. The fingers are thus maintained in correctly aligned position to pass within the appropriate lanes defined by the parting blades 31a as they travel downwardly and around the lower series of camming sheaves.

As shown in Figs. 2 and 7, I provide, adjacent the forward ends of the several parting blades 31a, spring fingers 58, two of these cooperating and being provided for each of the lanes. Fingers 58 are in the form of leaf springs and extend downwardly and rearwardly with their forward ends riveted or otherwise attached to the respective parting blades. The parting blades are rabbeted, as clearly shown in Fig. 7, in order that the lower edges of the flanges thereof may guard the tips of the picker fingers as they move toward the ground line, preventing said tips from puncturing or injuring the fruit. The free ends of the spring fingers 58 extend inwardly of the cooperating picking fingers resiliently holding the same in close relation to the parting blades and likewise deflecting slightly and centering the fruit or other articles to be picked within the defined lanes. With this structure there is no chance for contact of the picker fingers with the fruit until the respective pairs of fingers have passed a point where they are approximately perpendicular with the ground and where they have cleared the free ends of the spring guard and centering fingers 58.

A protective netting or guard 59 covers the outer or top portion of the picker mechanism, including the fingers and the endless carriers and as shown this guard or netting is mounted upon the arcuate portions 57 of the picker frame adjacent the forward end thereof and extends to sectors 60 which may be integrally formed with the upper ends of the arms 31b of the frame members and is affixed to sectors 60.

The entire picker mechanism including the carrier frame CF, the endless carriers, creeper wheels, sprockets and camming sheaves is preferably counter-balanced on the forward end of the main frame 11 and to this end the end frame members 31 are provided at the proper points with upwardly and forwardly extending brackets 61 rigidly connected with the arms 31b, which brackets are swingably mounted on a strong transverse shaft 62 journaled in suitable bearings 62a which are supported below the outer ends of the journal members which constitute the main vehicle frame 11. The counter-balanced carrier or picker frame CF may be lifted at its forward end a predetermined distance by a suitable means such as a flexible element or cable 63 connected with the upper end of the arms 31b and passing beneath a small sheave mounted on frame 11 and connected with means such as a lever 64 which carries a spring tooth cooperating with a sector 64a mounted on the vehicle frame.

The power for driving the picker mechanism including the carrier chains 37 as well as the creeper wheels is derived from the heavy shaft 62. Shaft 62 has affixed to one of its projecting ends a suitable sprocket 65 which is connected for driving by a chain 66 with the power take off sprocket 30 fixed to one of the traction wheels 12, as shown, at the left hand side of the machine. Shaft 62 at the opposite end from sprocket 65 carries a driving sprocket 67 which is fixed to a clutch sleeve 67a loosely mounted on shaft 62. Sprocket 67 is connected for driving sprocket 46a at the right hand end of the chain driving shaft 46 by means of a short chain 68. Suitable clutch mechanism 69 is provided for connecting and disconnecting sprocket 67 with shaft 62. As shown, said clutch mechanism includes a clutch sleeve 69a, the longitudinal movement of which is controlled by means of a shipper lever 70. Shipper lever 70 is pivoted to the right hand side and forward end of the vehicle frame 11 and may be actuated by means of a cable 71 which is connected at its rear end to a suitable sector equipped lever 72 mounted on the right hand side of frame 11.

Power take off sprocket 30 and sprockets 65, 67, 46a and the endless chain driving sprockets 45 are of such sizes and proportions that the chain driving sprockets 45, at their peripheries, will turn at the same speed at all times as the turning movement of the traction wheels 12, whereby the travel of the endless carriers with the pickers thereon will be precisely synchronized at the short and lower run of the endless carriers with the travel of the machine over the ground.

Mounted on the vehicle frame 11 is a slightly declined collecting trough 73 as best shown in Figs. 1 and 4. Trough 73 has a relatively wide receiving portion 73a traveling substantially the entire width of frame 11 and which comunicates with relatively narrow longitudinal legs 73b extending longitudinally of the frame 11 and terminating at the rear of the vehicle at a point considerably above a suspended platform 74 which is adapted to accommodate a receptacle such as a crate or "lug box". Diverging guide boards 73c assist in properly guiding the delivered articles such as fruit or nuts to the narrow legs 73b.

The fruit or other articles picked are delivered at the upper and rearward end of the carrier frame, at that time the cooperating fingers 54 of the several picker elements being expanded by the camming sheave 38. To facilitate the delivery of the dropped fruit or articles to trough 73, I provide a pan 75 which may be in the form of a transverse sheet metal plate telescopically overlapping the enlarged forward edge of trough 73 and supported by and rigidly secured to a pair of swingable arms 76 which are pivoted at their forward ends to the upper portions of the inclined end pieces 31b of the carrier frame. The swingable mounting of pan 75 assures proper delivery of the dropped fruit or articles in all operative positions of the angular picker or carrier frame as it passes over irregularities in the contour of the ground.

An operator's seat 77 is conveniently mounted between the longitudinal legs 73b of the collecting trough at a point above the generator 24 and accessible to the steering lever 21, the carrier frame adjusting lever 64 and the clutch operating lever 72.

If desired and especially in view of the fact that my machine carries an electrical generator, flood lights or headlights may be mounted on the frame to illuminate the ground and the collecting and inspection trough in order that the machine may be operated successfully at night.

Operation

My machine may be moved under its own power to the location where the prunes, fruit or other articles are to be picked at which time the picker or carrier frame CF is tilted backwardly with the parting blades and creeper wheels disposed a short distance above the ground level and held in that position by means of the cable 63 actuated by the lever 64. The starting, stopping and speed of the machine is controlled from the driver's seat through the conventional electrical controller or starting rheostat provided in the electrical circuit for the driving motors M.

In the picking operation elevating lever 64 is released, the forward end of the picker frame being then supported by creeper wheels 50a from the ground. Clutch controlling lever 72 is then actuated to set the picking mechanism in operation and the machine is then driven over the ground, operating upon a swath in each of its courses. The prunes, nuts or other articles to be picked are caused to arrange themselves within the lanes defined by parting blades 31a in rows extending longitudinally of the machine and any articles directly in the path of the parting blade extensions 49 will be deflected laterally, either inwardly or outwardly of the path of the picking mechanism and cannot be crushed by the creeper wheels 50a, the traction wheels 12 or steering wheels or drums 15. The fingers 54 of the picker elements E as they travel between the upper and lower camming sheaves 38 in counter-clockwise direction are normally held in closed position by the contractile springs 55. As the elements pass around the camming sheaves in a tangential course the curved camming arms 54b of fingers 54 are engaged by the inner peripheries of the disks 38a of the camming sheaves swinging the elongated grasping ends of the fingers outwardly into open position. This camming action is substantially frictionless in that the carrier chains 37 are meshed with the sprocket portions 38b of the camming sheaves, the camming sheaves therefore being synchronized with the travel of the chains. The cooperating fingers 54 of the successive picker elements E pass forwardly and downwardly around the lower series of camming sheaves 38 guided by the arcuate bars at the forward portion of the carrier frame and then are accurately guided in the lanes defined by the rabbeted portions of the parting blades and by the spring guiding and protecting fingers 58 which are carried by the sides of the parting blades at the forward portions thereof. The articles to be picked are centered in the respective lanes by the action of fingers 58 and as clearly shown in Fig. 7 are disposed between the cooperating fingers of the picker elements. Immediately upon disengagement of the camming arms 54b of the fingers from the lower camming sheave the fingers are urged to closed position by the contractile springs 55, grasping the fruit or articles without rubbing or chafing the same against the ground inasmuch as the speed of the endless carriers or chains 37 between camming sheaves 38 and driving sprockets 45 is perfectly synchronized with the travel of the machine over the ground. Driving sprockets 45 for the endless chains are disposed slightly above the level of the camming sheaves 38 in order that the articles picked may be gradually elevated from the ground immediately after they are grasped. The picked articles are then elevated to points below the upper series of camming sheaves 38 where the camming action previously described is repeated with reference to the cooperating fingers 54 and said fingers are again swung to open position releasing the picked fruit upon the pan 75 and the forward end of the collecting and inspection trough. The operator of the machine as well as attendants standing on the rear platform 74 may observe the articles picked and delivered and may throw out by hand any few stones or clods which may be picked. The articles are conveyed by the longitudinal legs 73b of the collecting trough to receptacles or crates disposed on the rear platform 74, and the receptacles may be removed to the ground by the attendants when filled.

The traction wheels 12 and steering wheels or rollers 15 are preferably of such widths as to slightly pack the surface of the ground behind the picker mechanism, leaving the ground in the desired condition to receive the further dropping of the articles, such as fruit or nuts.

In the operation of the picker mechanism over uneven ground, elevating lever 64 is disposed in released position and the angular picker or carrier frame may tilt forwardly or rearwardly on the axis of shaft 62 to most efficiently conform to the contour. The forward end of the picker frame is supported upon the creeper wheels 50a and the traction of these wheels assist the travel of the frame and parting blades and through the uppermost surface of the ground.

From the foregoing description it will be seen that the picking of the fruit or other articles, automatically arranged in rows in the several lanes, is continuous and that practically every article approximating normal size which is within the confines of the parting blades will be grasped and conveyed by my mechanism. The picking operation reproduces very closely the actual grasping and removal of articles by the human hand and with my cooperating fingers 54 of the picking elements E very little pressure is required to grasp, remove and elevate such articles as prunes, apricots, apples and other fruit and walnuts. In operation upon prune plums I have found that a pressure on the cooperating fingers of the picker elements of less than six ounces is entirely adequate. Attention is also called to the fact that due to the swinging action of the picker elements and the spacing that articles varying considerably in dimensions may be successfully handled with my improved machine.

It will be further seen that the articles will be individually and cleanly picked without accumulation of dirt, rubbish and the like.

The clutch mechanism 69 for controlling the operation of the picking mechanism, it will be noticed, is purposely constructed so that if the travel of the vehicle is reversed it will be impossible to drive the endless carriers 37, thereby preventing damage to the picker elements and other working parts. The friction clutch mechanism illustrated in detail in Fig. 10 is for the purpose of obviating injury to the picker mechanism as well as to the fruit in the event that an obstacle such as a large rock, stump or the like is encountered.

It will, of course, be understood that various changes may be made in the form, details, proportions and arrangement of the parts, without departing from the scope of my invention, which generally stated consists in a device capable of carrying out the objects above set forth and in the novel parts and combinations of parts disclosed and defined in the appended claims.

What is claimed is:—

1. In a picking machine, an endless flexible element, means for driving the same and a series of picker elements mounted on said endless flexible element each comprising at least a pair of cooperating grasping fingers.

2. In a picking machine, an endless flexible element, a mounting for said element adapted to hold a portion thereof adjacent the ground, a series of individual picker elements mounted on said endless element, each of said picker elements comprising at least a pair of cooperating grasping fingers, means for driving said endless element and means for actuating said picker elements as they approach a position adjacent the ground.

3. A picking machine comprising a frame adapted to travel over the ground, an endless flexible carrier element, means supported from said frame on which said carrier element is mounted, means for positioning a run of said carrier element substantially parallel and adjacent the ground and a series of individual picker elements mounted on said endless carrier element.

4. A picking machine comprising a frame mounted for travel over the ground, an endless carrier member supported from said frame and extending in inclined relation to the ground, means for positioning a portion of said endless carrier substantially parallel to and slightly above the ground level, means for driving said endless carrier in the direction of travel of said frame and at the same speed as the speed of travel of said frame and a series of individual picker elements mounted on said endless carrier.

5. A picking machine comprising a frame mounted for travel over the ground, an endless carrier member supported from said frame and extending in inclined relation to the ground, means for positioning a portion of said endless carrier substantially parallel to and slightly above the ground level, means for driving said endless carrier in the direction of travel of said frame and at the same speed as the speed of travel of said frame and a series of individual picker elements mounted on said endless carrier, said picker elements each comprising at least a pair of grasping fingers and means for actuating the fingers of said picker elements as they are brought into proximity with the ground.

6. A picking machine comprising a frame mounted for travel over the ground, an endless carrier member supported from said frame and extending in inclined relation to the ground, means for positioning a portion of said endless carrier substantially parallel to and slightly above the ground level, means for driving said endless carrier in the direction of travel of said frame and at the same speed as the speed of travel of said frame, a series of individual picker elements mounted on said endless carrier, said picker elements each comprising at least a pair of grasping fingers, means for actuating the fingers of said picker elements as they are brought into proximity with the ground, and means adjacent the upper portion of said carrier for releasing said picker elements to drop articles carried.

7. A picking machine comprising a frame mounted for travel over the ground, a carrier frame swingably mounted on said first mentioned frame, ground-engaging means for supporting the outer end of said carrier frame, an endless carrier mounted in said carrier frame and extending in inclined relation to the ground, a series of picker elements mounted on said endless carrier, means for actuating said picker elements adjacent the forward end of said frame for opening said elements and subsequently closing the same about material to be picked upon the ground, means adjacent the upper and rear end of said carrier for opening said picker elements to release material picked and means for driving said carrier at a speed synchronized with the travel of said main frame over the ground.

8. A picking machine comprising a frame mounted for travel over the ground, a series of horizontal parting blades supported from said frame with their lower edges substantially in engagement with the ground, said blades extending longitudinally of the machine and defining a series of parallel lanes, a series of endless carriers supported from said frame in inclined position to the ground, each of said carriers working in one of said lanes and a series of contractile picker elements mounted on said endless carriers and means for mounting a portion of each of said endless carriers in position slightly above the ground level.

9. In picker mechanism, an endless carrier element and a series of picker elements mounted thereon, each of said picker elements comprising at least a pair of fingers and means for urging said fingers together and means associated with said endless carrier for intermittently retracting the fingers of said picker elements and releasing the same.

10. A picking machine comprising a frame mounted for travel over the ground, a series of horizontal parting blades supported from said frame with their lower edges disposed adjacent the ground, said blades extending longitudinally of the machine and defining a series of parallel lanes, endless carrier means supported by said frame and several series of picker elements mounted on said carrier means, each of said series working in one of said lanes.

11. A picking and harvesting machine comprising a frame mounted for travel over the ground, endless carrier means supported from said frame and extending in rearwardly inclined relation to the ground, said carrier means extending at its forward and lower end to a position just above the ground, a multiplicity of individual picker elements mounted on said endless carrier means, said picker elements each comprising cooperating grasping members, means adjacent the rear and upper portion of said carrier means for releasing material picked and carried by said picker elements and means supported from said frame and disposed below said last mentioned means for receiving the released material.

12. A picking and harvesting machine comprising a frame mounted for travel over the ground, endless carrier means supported from said frame and extending in rearwardly inclined relation to the ground, said carrier means extending at its forward and lower end to a position just above the ground, a multiplicity of individual picker elements mounted on said endless carrier means, said picker elements each comprising cooperating grasping members, means adjacent the rear and upper portion of said carrier means for releasing material picked and carried by said picker elements, an inspection trough mounted on said frame and having its forward end disposed below said last mentioned means for receiving and conveying rearwardly the released material and means for collecting material discharged from said trough.

13. In picker mechanism, an endless carrier element, a camming sheave about which said carrier element is trained, said camming sheave having oppositely inclined camming surfaces formed on its periphery, a series of picker elements mounted on said endless carrier and each comprising a pair of fingers and means for urging said fingers into cooperation, said fingers having arms projecting inwardly of said carrier element for engagement with the inclined camming surfaces of said sheave for retracting said fingers and subsequently releasing the same.

14. In picker mechanism, an endless chain, a camming sheave having a centrally disposed sprocket about which said chain is trained, said sheave having also a pair of oppositely inclined camming surfaces disposed at the sides of said sprocket, a series of picker elements mounted on said endless chain and each comprising a pair of cooperating fingers, means for urging said fingers together, said fingers having arms projecting inwardly of said chain for engagement with the inclined camming surfaces of said sheave to retract the fingers and subsequently release the same.

15. A picking and harvesting machine comprising a wheel-supported frame, a carrier frame supported from said first mentioned frame, an endless carrier mounted in said carrier frame and extending in inclined relation to the ground, the forward and lower end of said endless carrier being disposed just above the ground level, a series of picker elements mounted on said endless carrier and driving connections between one of the wheels of said frame and said endless carrier for driving said carrier at its lower run in the direction of travel of said frame and at the same speed as the speed of travel of said frame over the ground.

16. In a picking machine, an endless carrier member, means for positioning a portion of said member substantially parallel to and slightly above the ground level, means for driving said endless carrier member, a series of individual picker elements mounted on said endless carrier each being adapted to grasp and remove an article from the ground, means associated with a portion of said carrier adjacent the ground for actuating said picker elements to grasp and remove an article and means removed some distance from the ground and associated with said picker elements for actuating the same to release articles carried.

ARTHUR J. BEHLING.